(12) United States Patent
Suzuki et al.

(10) Patent No.: US 8,988,000 B2
(45) Date of Patent: Mar. 24, 2015

(54) POWER SUPPLY DEVICE AND ILLUMINATION DEVICE

(71) Applicant: Minebea Co., Ltd., Kitasaku-Gun, Nagano (JP)

(72) Inventors: Shinichi Suzuki, Hamamatsu (JP); Hideharu Kanamitsu, Fukuroi (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 14/025,268

(22) Filed: Sep. 12, 2013

(65) Prior Publication Data

US 2014/0292219 A1   Oct. 2, 2014

(30) Foreign Application Priority Data

Mar. 26, 2013   (JP) .................. 2013-063388

(51) Int. Cl.
  *H05B 37/00* (2006.01)
  *H02M 7/12* (2006.01)
  *H02M 1/32* (2007.01)
  *H05B 33/08* (2006.01)

(52) U.S. Cl.
  CPC ............... *H02M 7/125* (2013.01); *H02M 1/32* (2013.01); *H05B 33/0815* (2013.01); *H05B 33/0845* (2013.01)
  USPC ......... 315/287; 315/185 R; 315/297; 315/312

(58) Field of Classification Search
  CPC ........... H05B 41/2928; H05B 41/2828; H05B 33/0815
  USPC ............. 315/185 R, 287, 291, 294, 297, 302, 315/307, 312
  See application file for complete search history.

(56) References Cited

U.S. PATENT DOCUMENTS

| 7,239,089 | B2* | 7/2007 | Suzuki et al. | 315/209 R |
| 7,518,319 | B2* | 4/2009 | Konno et al. | 315/291 |
| 2009/0015180 | A1* | 1/2009 | Yamashita | 315/307 |
| 2010/0090604 | A1* | 4/2010 | Maruyama et al. | 315/119 |
| 2011/0095700 | A1 | 4/2011 | Kanamori et al. | |
| 2011/0156612 | A1* | 6/2011 | Kanamori et al. | 315/291 |
| 2011/0193488 | A1* | 8/2011 | Kanamori et al. | 315/209 R |
| 2011/0234115 | A1* | 9/2011 | Shimizu et al. | 315/287 |

(Continued)

FOREIGN PATENT DOCUMENTS

| JP | 9-238466 A | 9/1997 |
| JP | 2004-140969 A | 5/2004 |

(Continued)

OTHER PUBLICATIONS

Office Action issued on Oct. 7, 2014 in the corresponding Japanese Patent Application 2013-063388.

*Primary Examiner* — Jason M Crawford
(74) *Attorney, Agent, or Firm* — Carrier Blackman & Associates, P.C.; Joseph P. Carrier; Jeffrey T. Gedeon (57) ABSTRACT

A power-supply device includes a rectifying unit configured to rectify a phase-controlled AC voltage; a current limiting unit including a current limiting resistor, which limits an input current flowing from the rectifying unit at rise of a rectified voltage outputted from the rectifying unit; and an adjustment unit configured to cause the current limiting unit to limit the input current flowing from the rectifying unit until a predetermined time period has elapsed after an input of the AC voltage to the rectifying unit is started.

7 Claims, 8 Drawing Sheets

(56) References Cited

U.S. PATENT DOCUMENTS

2012/0049755 A1* 3/2012 Shimizu et al. ............... 315/246
2012/0068606 A1* 3/2012 Otake ........................... 315/125
2012/0104970 A1* 5/2012 Okubo et al. .................. 315/291
2013/0026946 A1* 1/2013 Maruyama et al. ........... 315/246

FOREIGN PATENT DOCUMENTS

| JP | 2011-90990 A | 5/2011 |
| JP | 2012-150955 A | 8/2012 |

* cited by examiner

POWER SUPPLY DEVICE AND ILLUMINATION DEVICE

CROSS-REFERENCE TO BACKGROUND APPLICATION

This application claims priority from Japanese Patent Application No. 2013-063388 filed on Mar. 26, 2013, the entire subject matter of which is incorporated herein by reference.

TECHNICAL FIELD

This disclosure relates to a power-supply device and an illumination device, and more specifically, to a power-supply device and an illumination device configured to perform dimming and lighting a light source.

BACKGROUND

There is a power-supply device capable of performing dimming and lighting a light source, based on an AC voltage with a phase dimming (e.g., JP-A-2012-150955).

The power-supply device disclosed in JP-A-2012-150955 includes a current limiting unit having an current limiting resistor for limiting an input current during the rise of an input voltage which is obtained by rectifying a phase-controlled AC voltage, a phase angle detection unit for detecting a phase angle of the input voltage, and a suspend unit for suspending a function of the current limiting unit. The suspend unit suspends the function of the current limiting unit when the phase angle detected by the phase angle detection unit is within a predetermined range.

SUMMARY

The power-supply device disclosed in JP-A-2012-150955 operates as follows, in order to suppress flowing of a high inrush current in a normally driving state. When an input current (inrush current) is low during the rise of the input voltage, that is, in a case where a phase angle of the input voltage is within a predetermined range, the function of the current limiting unit is suspended. Meanwhile, when the inrush current is high, that is, the phase angle of the input voltage is not within the predetermined range, the function of the current limiting unit is effective, so that the input current is limited by the current limiting unit.

However, such power-supply device has a possibility of causing the following problem. That is, at the start-up at which application of the input voltage starts, the function of the current limiting unit is suspended before electric charges are sufficiently stored in an electric storage portion, such as a capacitor, connected to a rear end of the current limiting unit. Therefore, there is a problem in that a high inrush current flows by charging current flowing in the electric storage portion, such as the capacitor.

The problem occurring in the power-supply device of the background art will now be described in detail.

Figure 8:
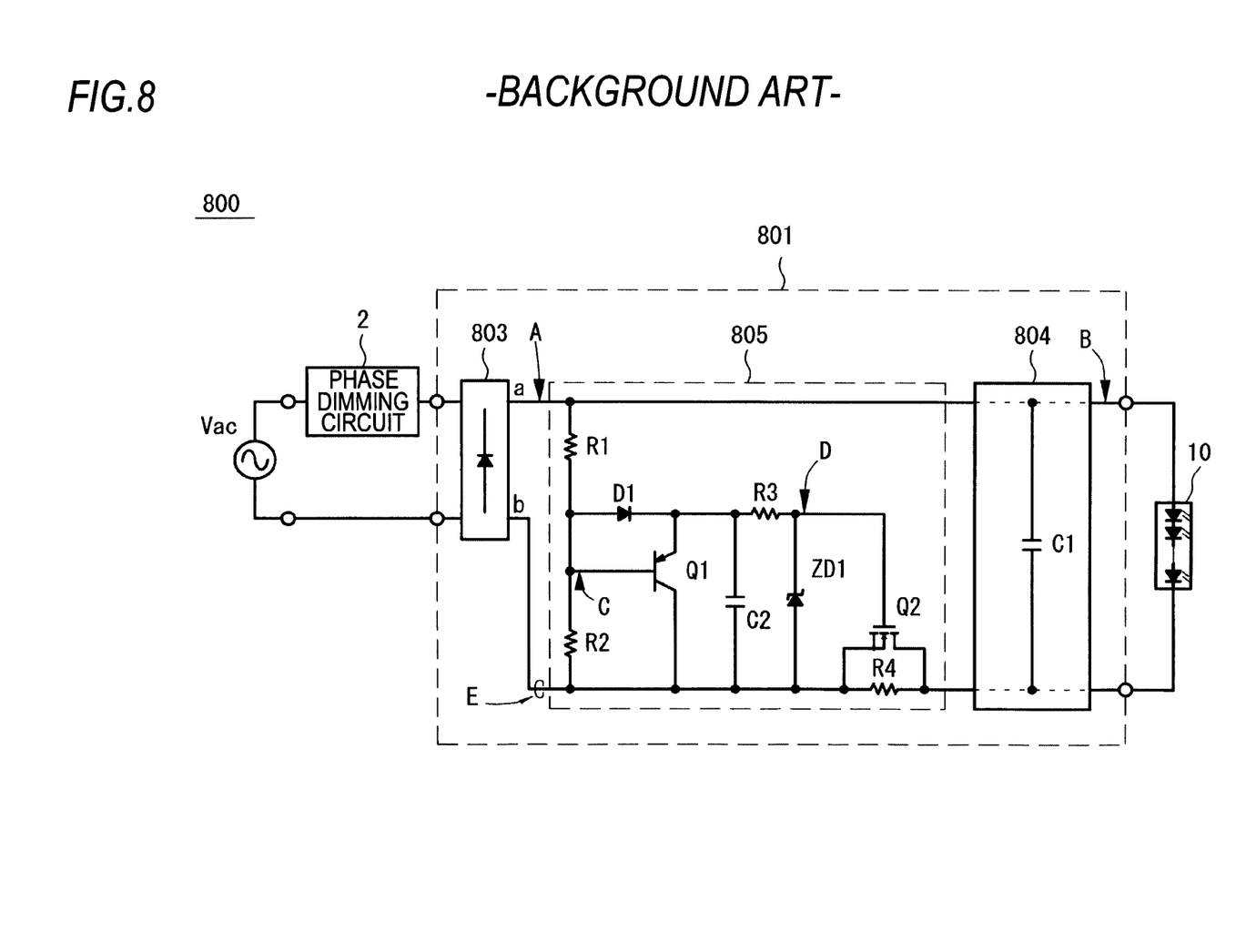
FIG. 8 is a diagram illustrating a circuit configuration of an illumination device using a power-supply device of the background art.

FIG. 8 is a diagram illustrating a circuit configuration of an illumination device using the power-supply device of the background art.

As illustrated in FIG. 8, the illumination device 800 includes an AC power source Vac, a phase dimming circuit 2, a power-supply device 801, and an LED module 10. The phase dimming circuit 2 outputs a phase-controlled AC voltage based on the AC voltage from the AC power source Vac.

The term "phase controlled" herein means a control of conducting the AC voltage by a predetermined period in a half cycle of the AC voltage.

The power-supply device 801 includes the following components.

A rectifying circuit 803 is, for example, a full-wave rectifying circuit. The full-wave circuit 803 rectifies the AC voltage to output a rectified voltage.

A converter circuit 804 supplies a predetermined current to the LED module 10. The converter circuit 804 has a capacitor C1 which is charged or discharged according to the rectified voltage to be inputted.

A current limiting circuit 805 includes a current limiting resistor R4, a switching element Q2, a zener diode ZD1, resistor elements R1, R2 and R3, a switching element Q1 (transistor), a diode D1, and a capacitor C2. The current limiting resistor R4 is provided to limit the input current (inrush current) at the rise of the rectified voltage from the rectifying circuit 803. The switching element Q2 has a drain terminal and a source terminal which are connected to both ends of the current limiting resistor R4. The current limiting circuit 805 performs an operation of preventing an inrush current to apply the current to the current limiting resistor R4 at the start-up. After that, the switching element Q2 of the current limiting circuit 805 is turned on slightly behind a rising edge of the AC voltage every time the AC voltage is raised, to reduce the power loss which is consumed by the current limiting resistor R4, and thus is in an ON state, and ON/OFF is repeated in a cycle of the AC voltage. As the switching element Q1 is turned on/off and then the switching element Q2 is turned off/on, the current limiting circuit 805 reduces the power loss which is consumed by the current limiting resistor R4.

In this instance, the inrush current is a current mainly flowing in the capacitor C1 or the like.

Figure 9:
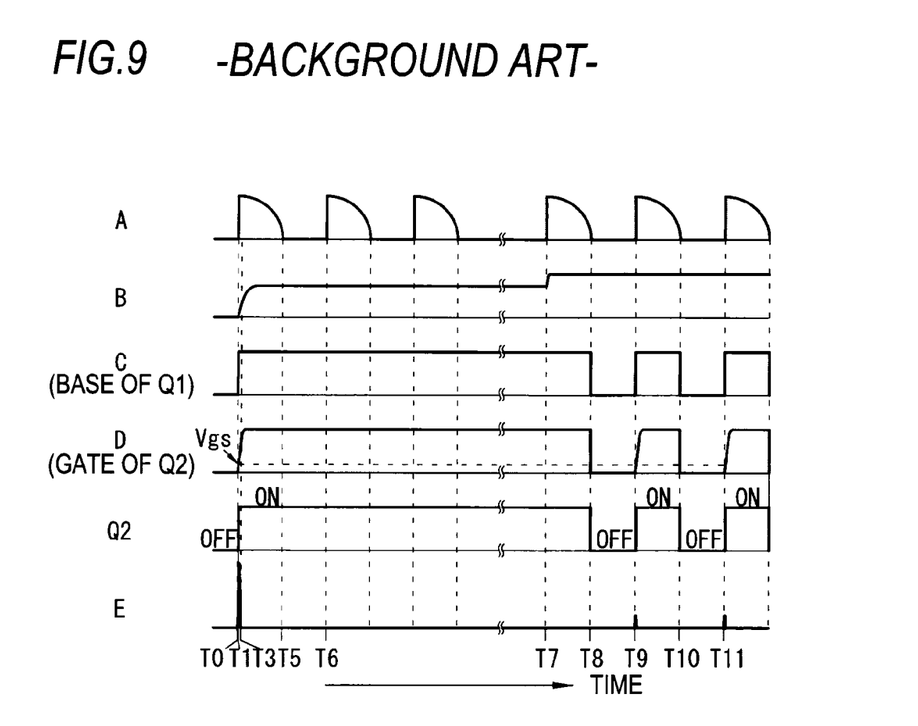
FIG. 9 is a timing chart illustrating its operation when the phase angle of the power-supply device 801 of the background art is 90 degrees and 270 degrees, respectively.

FIG. 9 is a timing chart illustrating its operation when the phase angle of the power-supply device 801 of the background art is 90 degrees and 270 degrees, respectively.

FIG. 9 illustrates waveforms of voltage and current of each unit of the power-supply device 801 when and after starting up the power-supply device 801. In FIG. 9, each of waveforms A to F corresponds to each of sections A to E illustrated in FIG. 8. In FIG. 9, the waveform A denotes a rectified voltage, the waveform B denotes an output voltage, the waveform C denotes a base potential of the switching element Q1, and the waveform D denotes a gate potential of the switching element Q2. The waveform E denotes a current flowing in a terminal b of the rectifying circuit 803. Further, in FIG. 9, an operating state of the switching element Q2 is shown.

Figure 10:
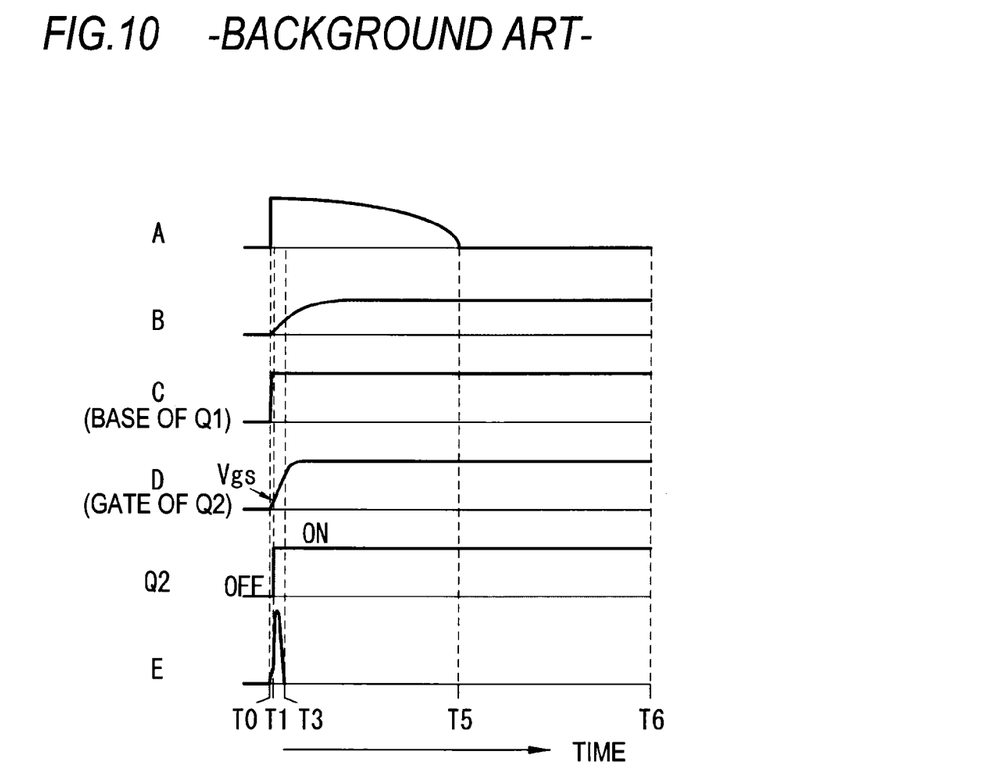
FIG. 10 is an enlarged view illustrating a time period from a time T0 to a time T6 of FIG. 9 with extending in a time axial direction.

FIG. 10 is an enlarged view illustrating a time period from a time T0 to a time T6 of FIG. 9 with extending in a time axial direction.

As illustrated in FIG. 10, first, the input of the AC voltage starts at the time T0, and the power-supply device 801 starts up. At that time, a current flows in the section E by a predetermined current value. The current value reaches the maximum value determined according to a resistance value of the current limiting resistor R4, that is, a value obtained by dividing the input voltage by the resistance value of the current limiting resistor R4.

In the section C, the base potential of the switching element Q1 is abruptly raised after the input of the AC voltage starts. For this reason, the switching element Q1 is changed from the ON state to the OFF state at short times after the start (from the time T0).

At the time T1, the gate potential of the switching element Q2 reaches an ON voltage Vgs (section D), so that the switching element Q2 is in the ON state. If the switching element Q2 is in the ON state, the current limiting resistor R4 is short-circuited. As a result, the current does not flow in the current limiting resistor R4, so that the function of the current limiting circuit 805 is suspended.

When the function of the current limiting circuit 805 is suspended at the time T1, the inrush current flows still, and the electric charges are not sufficiently charged in the capacitor C1. For this reason, during the rising period from the time T1 to the time T3 in which the switching element Q2 is in the ON state, the high inrush current flows in the section E. For example, a current is a few amperes when the current limiting resistor R4 works, but the inrush current may reach dozens amperes.

This disclosure provides at least a power-supply device and an illumination device capable of suppressing an inrush current from flowing at start-up.

In view of the above, a power-supply device according to one aspect of this disclosure, comprises: a rectifying unit configured to rectify a phase-controlled AC voltage; a current limiting unit including a current limiting resistor, which limits an input current flowing from the rectifying unit at rise of a rectified voltage outputted from the rectifying unit; and an adjustment unit configured to cause the current limiting unit to limit the input current flowing from the rectifying unit until a predetermined time period has elapsed from when an input of the AC voltage to the rectifying unit is started.

In the above-described power-supply device, the current limiting unit may include a switching element which is connected in parallel to the current limiting resistor, and the current limiting unit is configured to limit the input current using the current limiting resistor when the switching element is in an OFF state, and the adjustment unit may cause the switching element to be in the OFF state until the predetermined time period has elapsed after the input of the AC voltage to the rectifying unit is started.

In the above-described power-supply device, the switching element may be configured to be in the OFF state when the input of the AC voltage to the rectifying unit starts and is configured to be in an ON state after the input of the AC voltage to the rectifying unit starts, the predetermined time period may be a time from when the input of the AC voltage to the rectifying unit starts to when the switching element is in the ON state, and wherein the adjustment unit may delay a timing at which the switching element is in the ON state, until the predetermined time period has elapsed after the input of the AC voltage to the rectifying unit is started.

In the above-described power-supply device, the switching element may be to be in the ON state in accordance with a voltage to be applied to a control terminal thereof, and wherein the adjustment unit suppresses a rise rate of the voltage to be applied to the control terminal after the input of the AC voltage to the rectifying unit starts to delay the timing at which the switching element is in the ON state.

In the above-described power-supply device, the adjustment unit may include a charge unit which is charged based on a current flowing after the input of the AC voltage to the rectifying unit starts, and the predetermined time period may be a time period corresponding to a time constant of the charge unit.

The above-described power-supply device may include a converter circuit unit including a capacitor connected to a rear end of the rectifying unit and charged in accordance with the rectified voltage, and the time constant of the charge unit may be set to correspond to a time until a voltage of the capacitor reaches a predetermined voltage after the input of the AC voltage to the rectifying unit is started.

In the above-described power-supply device, the adjustment unit may includes a discharge unit to discharge electric charges charged in the charge unit when the input of the AC voltage to the rectifying unit is stopped, the time constant of the discharge unit may be set to be smaller than a start-up interval from the stop of the input of the AC voltage to restart of the input.

An illumination device of this disclosure is configured by the above-described power-supply unit and a light source, to which electrical power is supplied from the power-supply device.

According to the above configurations, the adjustment unit causes the current limiting unit to limit the input current until the predetermined time period has elapsed after the input of the AC voltage to the rectifying unit is started. Accordingly, the power-supply device and the illumination device which can prevent the flowing of the inrush current at the start-up can be provided.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, an illumination device employing a power-supply device according to one illustrative embodiment of this disclosure will be described.

Illustrative Embodiment

Figure 1:
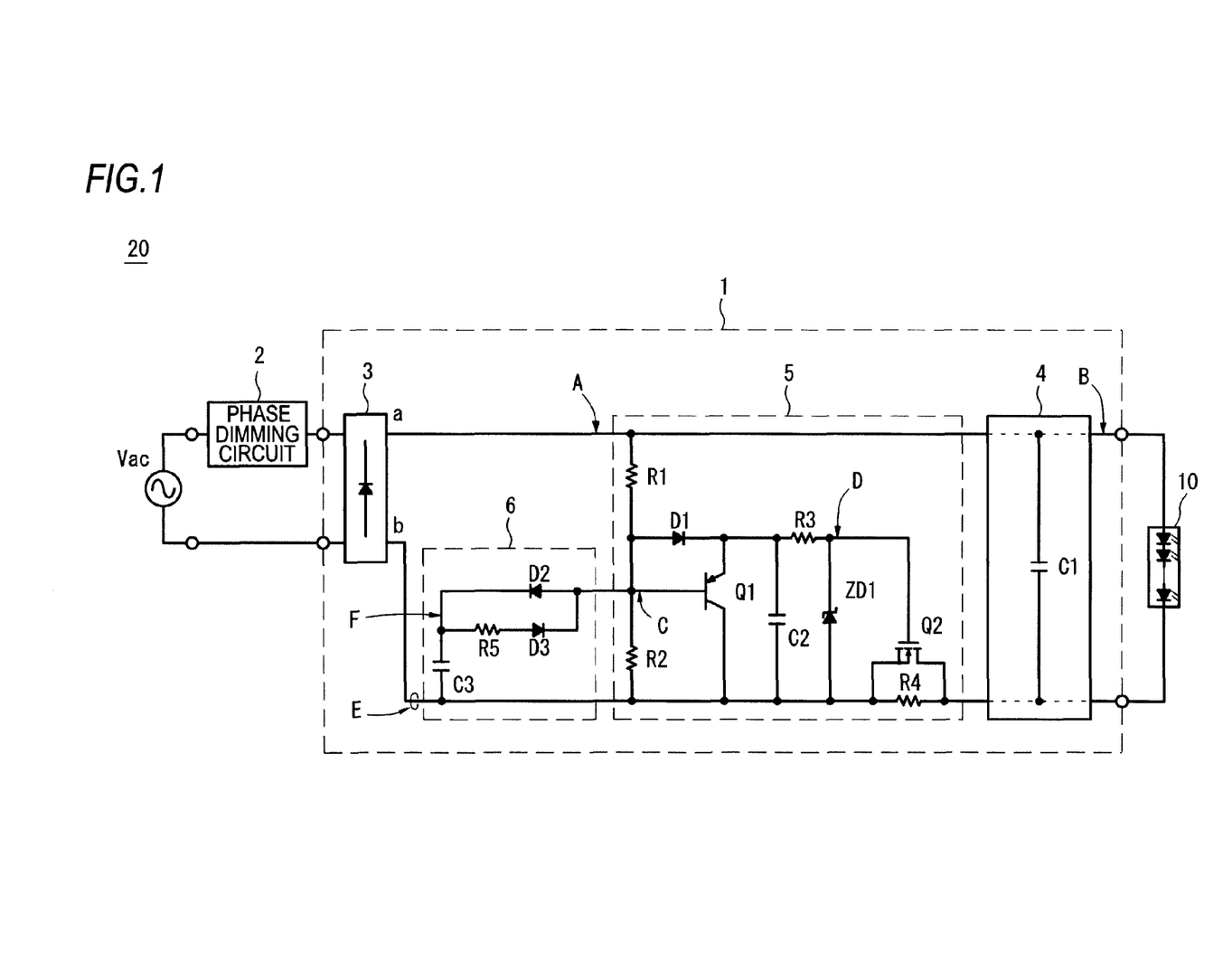
FIG. 1 is a diagram illustrating a circuit configuration of an illumination device employing a power-supply device according to a first illustrative embodiment of this disclosure.

FIG. 1 is a diagram illustrating a circuit configuration of the illumination device employing the power-supply device according to one illustrative embodiment of this disclosure.

As illustrated in FIG. 1, an illumination device 20 includes an AC power source Vac, a phase dimming circuit 2, a power-supply device 1, and an LED module (one example of a light source) 10. The LED module 10 is driven by the supply of electrical power from the power-supply device 1.

The phase dimming circuit 2 is connected to the AC power source Vac. The phase dimming circuit 2 outputs the phase-controlled AC voltage based on the AC voltage from the AC power source Vac. That is, the phase dimming circuit 2 conducts the AC voltage by a predetermined period in a half period of the AC voltage, thereby outputting the AC voltage. The phase dimming circuit 2 includes, for example, a triac, but the detailed configuration of the phase dimming circuit 2 is not limited thereto.

The power-supply device 1 includes a rectifying circuit (one example of a rectifying unit) 3, a converter circuit unit 4, a current limiting circuit (one example of a current limiting unit) 5, and an adjustment circuit (one example of an adjustment unit) 6.

The rectifying circuit 3 is, for example, a full-wave rectifying circuit. The rectifying circuit 3 full-wave rectifies the AC voltage to output a rectified voltage. In this instance, the rectifying circuit 3 may be a half-wave rectifying circuit.

The converter circuit unit 4 supplies a predetermined current (constant current) to the LED module 10. The converter circuit unit 4 has a capacitor which is charged or discharged in accordance with the rectified voltage to be inputted.

Figure 2:
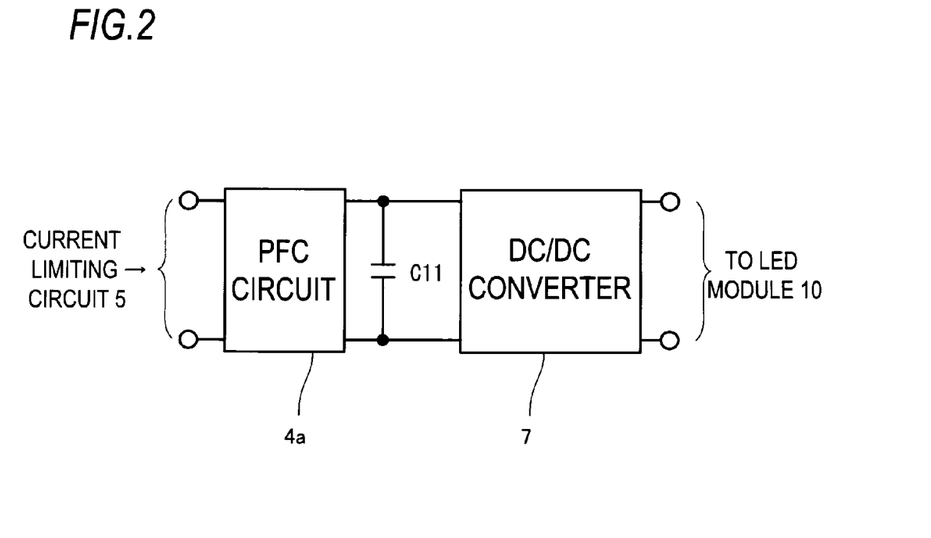
FIG. 2 is a diagram illustrating a configuration of a converter circuit unit.
Figure 3:
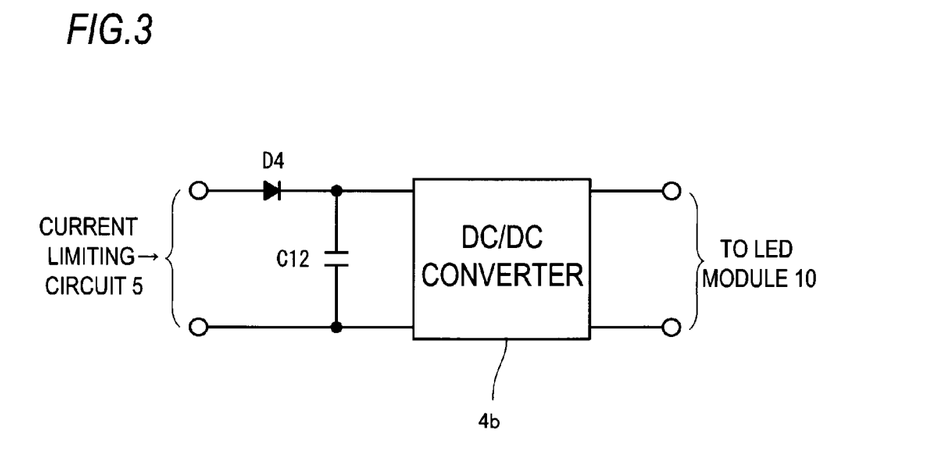
FIG. 3 is a diagram illustrating another example of the configuration of the converter circuit unit.

FIG. 2 is a diagram illustrating a configuration of the converter circuit unit 4. FIG. 3 is a diagram illustrating another example of the configuration of the converter circuit unit 4.

As illustrated in FIG. 2, the converter circuit unit 4 has, for example, a PFC circuit (Power Factor Correction circuit) 4a, an output capacitor C11, and a DC/DC converter 7. The output capacitor 11 corresponds to the capacitor C1 in FIG. 1.

The configuration of the converter circuit unit 4 is not limited to that illustrated in FIG. 2. That is, as illustrated in FIG. 3, the converter circuit unit 4 may have a DC/DC converter 4b, an input capacitor C12 disposed at its front end (to the current limiting circuit 5 as the rectifying circuit 3), and a diode D4.

In FIG. 1, the current limiting circuit 5 has a current limiting resistor R4, a switching element Q2, a zener diode ZD1, resistor elements R1, R2 and R3, a switching element Q1, a diode D1, and a capacitor C2. The current limiting circuit 5 is provided between the rectifying circuit 3 and the converter circuit unit 4.

The current limiting resistor R4 is disposed at a low-voltage-side line connecting a terminal b of the rectifying circuit 3 and the converter circuit unit 4. The current limiting resistor R4 is provided to limit the input current (inrush current) at the rise of the rectified voltage from the rectifying circuit 3.

The switching element Q2 is, for example, a field effect transistor (FET). A drain terminal and a source terminal of the switching element Q2 are connected to both ends of the current limiting resistor R4. That is, the switching element Q2 is connected in parallel to the current limiting resistor R4.

The resistor elements R1 and R2 divide the rectified voltage. The divided voltage is applied to a gate terminal (one example of a control terminal) of the switching element Q2 via the diode D1 and the resistor element R3. The zener diode ZD1 is disposed between a connection line from the resistor element R3 to the switching element Q2, and the low-voltage-side line (line of the terminal b of the rectifying circuit 3) to restrict the voltage applied to the gate terminal of the switching element Q2. The switching element Q1 and the capacitor C2 are disposed between the resistor element R3 and the diode D1. The capacitor C2 is disposed between the line, at which the resistor element R3 is disposed, and the low-voltage-side line. The switching element Q1 is, for example, a transistor. A base terminal of the switching element Q1 is connected to a point to which the resistor element R1 and R2 are connected. An emitter terminal of the switching element Q1 is connected to a line at which the resistor element R3 is disposed, and a collector terminal is connected to the low-voltage-side line.

While the power-supply device 1 is being started, the switching element Q2 of the current limiting circuit 5 is to be the ON state slightly behind a rising edge of the AC voltage every time the AC voltage is raised, that is, the rectified voltage is raised. That is, when the input of the AC voltage to the rectifying circuit 3 starts, the switching element Q2 is in the OFF state. After the input of the AC voltage to the rectifying circuit 3 starts, the switching element Q2 is in the ON state in accordance with the voltage applied to the gate terminal thereof.

When the switching element Q2 is in the OFF state, that is, the current limiting circuit 5 is turned on, the current flows in the current limiting resistor R4. As a result, the input current is limited at the rise of the rectified current to be outputted from the rectifying circuit 3. After that, as the switching element Q2 is in the ON state and the current limiting circuit 5 is turned off, the current flows via the current limiting resistor R4. In this way, since the limitation of the input current using the current limiting resistor R4 is performed only when necessary, the power loss, which is consumed by the current limiting resistor R4, is reduced. The switching element Q2 is alternatively repeated by the ON state and the OFF state in a cycle of a half period of the AC voltage.

The adjustment circuit 6 includes a resistor element R5, diodes D2 and D3, and a capacitor C3. The resistor element R5, the diode D3, and the diode D2 are connected in series to each other in this order to form a closed circuit. The point, at which the diode D3 and the diode D2 are connected, is connected to the point, at which the resistor element R1 and the resistor element R2 are connected. The capacitor C3 is disposed between the point at which the diode D2 and the resistor element R5 are connected, and the low-voltage-side line.

At the start-up of the power-supply device 1, the adjustment circuit 6 limits the input current to the current limiting circuit 5 until a predetermined time period has elapsed after the input of the AC voltage to the rectifying circuit 3 is started. That is, the adjustment circuit 6 serves to sustain the function of limiting the input current by the current limiting circuit 5 for the predetermined time period after the input of the AC voltage starts at the time of the start of the power-supply device 1. Specifically, the adjustment circuit 6 makes the switching element Q2 in the OFF state until a predetermined time period has elapsed after the input of the AC voltage to the rectifying circuit 3 is started. In other words, the predetermined time period is a time from when the input of the AC voltage to the rectifying circuit 3 starts to when the switching element Q2 is in the ON state.

(Operation of Adjustment Circuit 6 at Start-Up)

At the start-up of the power-supply device 1, the adjustment circuit 6 operates as follows.

First, when the input of the AC voltage starts (if start-up is initiated), the AC voltage flows sequentially via the resistor element R1 and the diode D2, so that the capacitor C3 is gradually charged. The diode D2 and the capacitor C3 can be referred to as a charge unit. The charge unit configures the resistor element R1 and the charge circuit, and it is configured to charge the capacitor C3 based on the current flowing after the input of the AC voltage to the rectifying circuit 3 is started.

The charge unit has a predetermined time constant. The time constant is determined by the resistor element R1 and the capacitor C3 (R1\*C3). In this illustrative embodiment, for example, the time constant is set so that the time, at which the voltage of the capacitor C3 reaches a predetermined voltage i.e. time when electric charges are charged more than a predetermined level, becomes one or more cycle of the AC voltage. Further, it is not limited to that the time constant is set to one or more cycle.

The base potential of the switching element Q1 is gradually increased as the capacitor C3 is charged with the electric charges. For this reason, the time required for switching the switching element Q1 from the ON state to the OFF state.

Since the time required for switching the switching element Q1 from the ON state to the OFF state is delayed, the gate potential (voltage applied to the control terminal) of the switching element Q2 is gradually increased. Accordingly, a timing, at which the switching element Q2 is to be in the ON state, is delayed as compared with a case where the adjustment circuit 6 is not provided. In other words, the adjustment circuit 6 suppresses a rise rate of the gate potential of the switching element Q2 after the input of the AC voltage to the rectifying circuit 3 starts, thereby delaying the timing at which the switching element Q2 is to be in the ON state.

In this way, since the adjustment circuit 6 is provided with the time constant, the predetermined time period has elapsed after the input of the AC voltage starts, and then the switching element Q2 is to be in the ON state. That is, after the input of the AC voltage starts, the inrush current does not flow. Therefore, the capacitor C1 is charged with predetermined electric charges (the voltage of the capacitor C1 reaches a predetermined value), and then the switching element Q2 is to be in the ON state. Until the predetermined time has elapsed after the input of the AC voltage starts, the input-current limiting function of the current limiting circuit 5 is sustained, so that the inrush current is limited by the current limiting resistor R4.

(Detailed Description of Operation at Start-Up)

Figure 4:
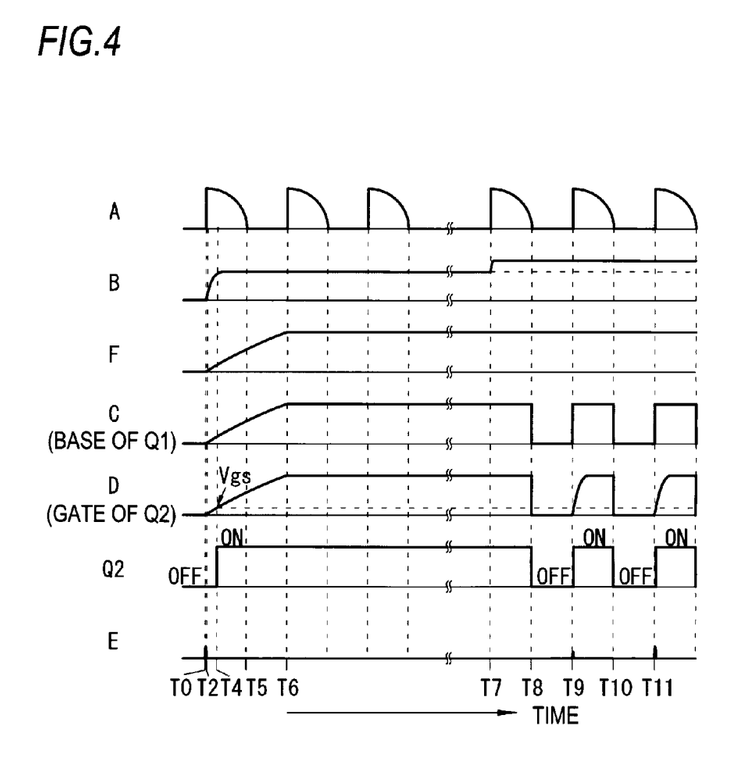
FIG. 4 is a timing chart illustrating its operation when a phase angle of the power-supply device at start-up is 90 degrees and 270 degrees, respectively.

FIG. 4 is a timing chart illustrating its operation when a phase angle of the power-supply device 1 at the start-up thereof is 90 degrees and 270 degrees, respectively.

FIG. 4 illustrates waveforms of the voltage and the current of each unit of the power-supply device 1 when and after the power-supply device 1 is started. In FIG. 4, each of waveforms A to F corresponds to each of sections A to E illustrated in FIG. 1. In FIG. 4, the waveform A denotes a rectified voltage, the waveform B denotes an output voltage, the waveform C denotes a base potential of the switching element Q1, and the waveform D denotes a gate potential of the switching element Q2. The waveform E denotes a current flowing in the low-voltage-side line connected to a terminal b of the rectifying circuit 3. The waveform F denotes the voltage of the capacitor C3. Further, FIG. 4 illustrates the operation state of the switching element Q2. Although the case where the phase angle of the rectified voltage A is respectively 90 degrees and 270 degrees in this illustrative embodiment, the phase angle is not limited thereto. The power-supply device operates at any phase angle in the same manner.

Figure 5:
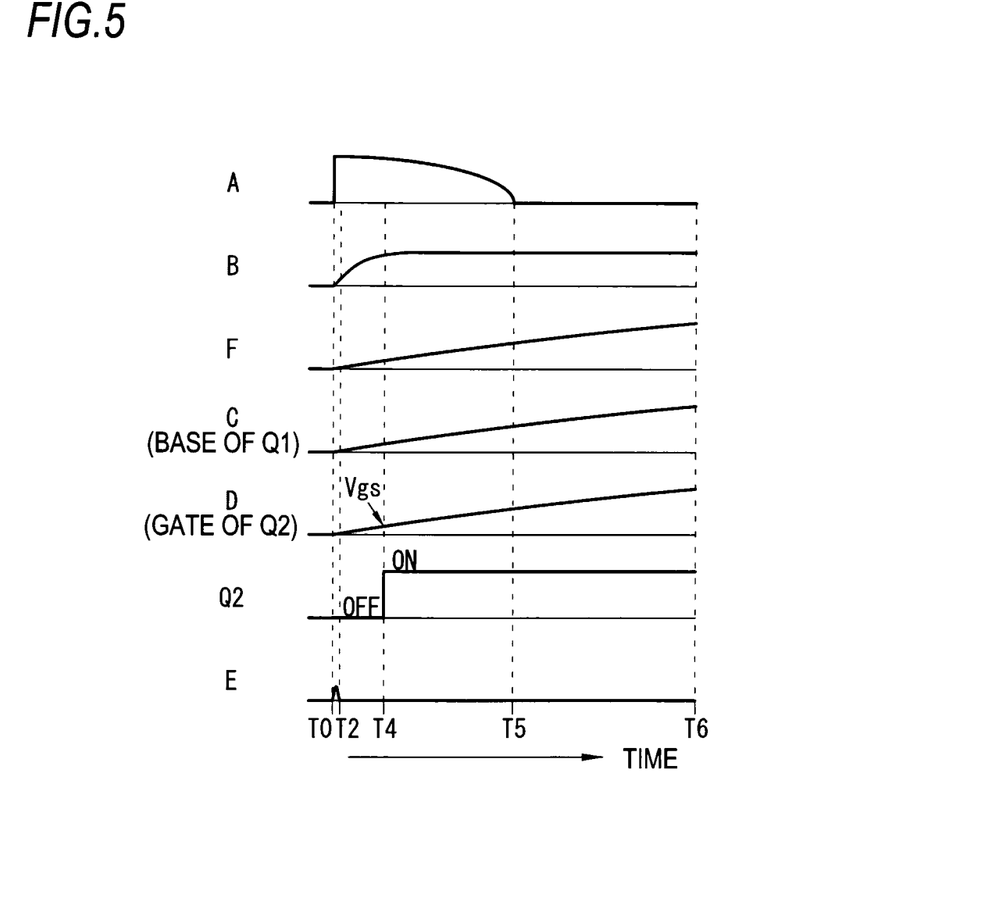
FIG. 5 is an enlarged view illustrating a time period from a time T0 to a time T6 of FIG. 4 with extending in a time axial direction.

FIG. 5 is an enlarged view illustrating a time period from a time T0 to a time T6 of FIG. 4 with extending in a time axial direction.

As illustrated in FIG. 5, first, the input of the AC voltage starts at the time T0, and the power-supply device 1 starts up. At that time, since the current flows into the capacitor C1, the current starts to flow in the section E. The current value becomes the inrush current (inrush current at the start-up) having a magnitude that reaches the maximum value (a value obtained by dividing the input voltage by a resistance value of the current limiting resistor R4) determined according to the resistance value of the current limiting resistor R4.

After that, at the time T2, a high current is not to be flowed to the section E.

In the section C, the base potential of the switching element Q1 is gradually raised after the input of the AC voltage is started. At the time T4, the gate potential of the switching element Q2 reaches the ON voltage Vgs (section D). In response to that, the switching element Q2 is to be in the ON state. When the switching element Q2 is in the ON state, the current limiting resistor R4 is short-circuited, so that the current is not to be flowed to the current limiting resistor R4. That is, the function of the current limiting circuit 5 is suspended, so that the limitation of the current using the current limiting resistor R4 is not performed.

At the time T4, at which the function of the current limiting circuit 5 is suspended, the flow of the inrush current in the section E, and the capacitor C1 is sufficiently charged with the electric charges (predetermined electric charges are charged therein) before the time T4. Accordingly, even though the switching element Q2 is to be in the ON state, the high inrush current does not flow in the section E.

As illustrated in FIG. 4, the ON state and the OFF state of the switching element Q2 are repeated after the time T8. However, since the capacitor C1 is previously charged with the electric charges of a predetermined value or more, the high inrush current does not flow to the section E, even though the switching element Q2 is in the ON state just after the rectified voltage is raised.

Additionally, the converter circuit unit 4 does not operate until the time T7. Accordingly, the current limiting circuit 5 does not also work between the time T4 and the time T7, but the inrush current at the rise of the rectified voltage does not flow to the LED module 10, since the capacitor C1 is charged with the electric charges of a predetermined value.

As described above, since the power-supply device 1 is equipped with the adjustment circuit 6 in this illustrative embodiment, the following effects are obtained. That is, since the charge unit has the time constant, the on timing, at which the switching element Q2 is to be in the ON state after the start-up, is delayed. It is possible to adjust the ON timing of the switching element Q2 by adjusting the time constant to an appropriate time. The ON timing of the switching element Q2 at the start-up of the power-supply device 1 is adjusted so that the switching element Q2 is turned on after the inrush current flows to the current limiting resistor R4 at the start-up and is stopped. Accordingly, since the switching element Q2 is sustained in the OFF state when the inrush current at the start-up flows and then the current is limited by using the current limit resistor R4, the high inrush current does not flow.

As described above, since it is possible to suppress the inrush current from flowing at the start-up of the power-supply device 1, the illumination devices 20 including a plurality of LED modules 10 can be driven in parallel by use of one phase dimming circuit 2 within an allowable range of a surge-on current (Itsm) of the triac element in the phase dimming circuit 2.

(Operation of Adjustment Circuit 6 at Restart)

In this illustrative embodiment, at the restart after the input of the AC voltage is stopped, the adjustment circuit 6 operates as follows.

That is, when the input of the AC voltage is stopped, the electric charges charged in the capacitor C3 are discharged via the capacitor C3, the resistor element R5, the diode D3, and the resistor element R2 in that order. That is, in this illustrative embodiment, the adjustment circuit 6 includes a discharge unit including the capacitor C3, the resistor element R5, and the diode D3. The discharge unit configures a discharge circuit together with the resistor element R2 and discharges the electric charges charged in the charge unit.

The discharge unit has a time constant. The time constant of the discharge unit is set to be smaller than a start-up interval from the stop of the input of the AC voltage to the restart of the input. That is, the time constant is determined by each property of the capacitor C3, the resistor element R5, and the resistor element R2 (C3*R5*R2). The time constant is set to be smaller than the start-up interval (time required for restarting the power-supply device 1 after the power source of the power-supply device 1 is turned off). For example, when the start-up interval is 500 msec, the time constant is set to 100 msec or less.

(Detailed Description of Operation at Restart)

Figure 6:
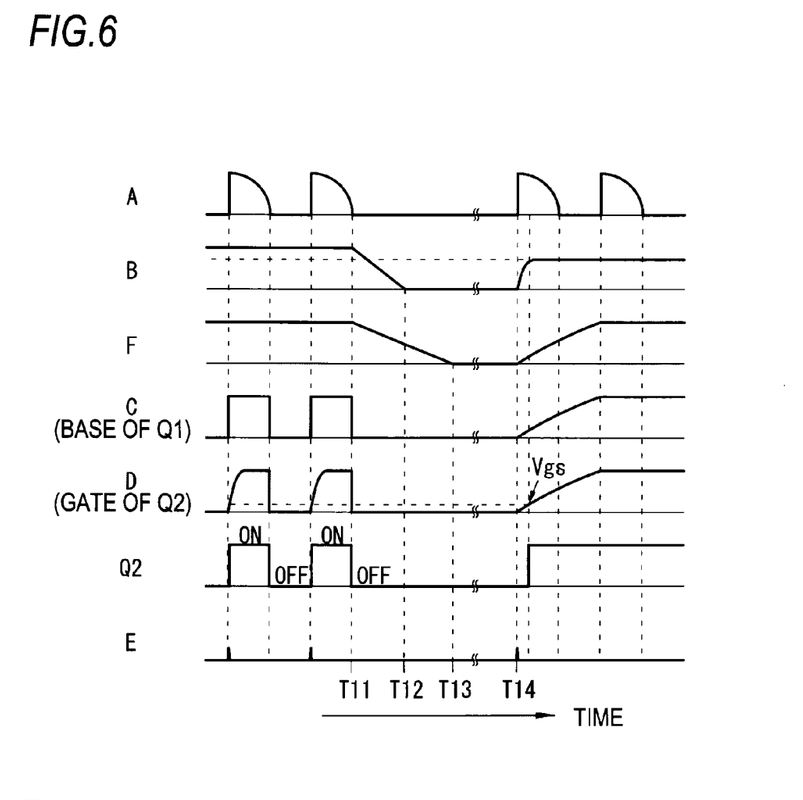
FIG. 6 is a timing chart illustrating the operation of the power-supply device at restart.

FIG. 6 is a timing chart illustrating the operation of the power-supply device 1 at the restart.

In FIG. 6, waveforms of the voltage and the current of each unit of the power-supply device 1 when and after the power-supply device 1 restarts are shown similarly to those in FIG. 4. As illustrated in FIG. 6, it is supposed that at a time T11, in which the power-supply device 1 is operated, the input of the AC voltage is stopped, and then the input of the AC voltage is restarted at a time T14.

If the input of the AC voltage is stopped at the time T11, the operation of the power-supply device 1 is also stopped. Herein, the time constant of the discharge unit is set to be smaller than the start-up interval from the time T11 to the time T14. For this reason, as illustrated by the waveform of the section F, the discharge of the electric charges charged in the capacitor C3 is terminated at a time T13 prior to the time T14.

When the restart is started at the time T14, similarly to the operation at the start-up of the above-described power-supply device 1, the delayed operation of the ON timing of the switching element Q2 by using the adjustment circuit 6 is carried out, and then the power-supply device 1 is started.

In this way, since the discharge unit having the time constant is provided in this illustrative embodiment, the time constant of the discharge unit is adjusted in advance, thereby adjusting the time to be taken until the discharge is terminated from when the input of the AC voltage is stopped. Since the time constant of the discharge unit is adjusted to make a termination timing of the discharge faster than the timing at which the power-supply device 1 restarts, the restart is activated in the state in which the electric charge of the capacitor C3 is zero. Accordingly, even at the restart, it is possible to operate the adjustment circuit 6 like the above-described start-up, thereby reliably limiting the inrush current using the current limiting circuit 5.

(Modification of Adjustment Circuit 6)

Figure 7:
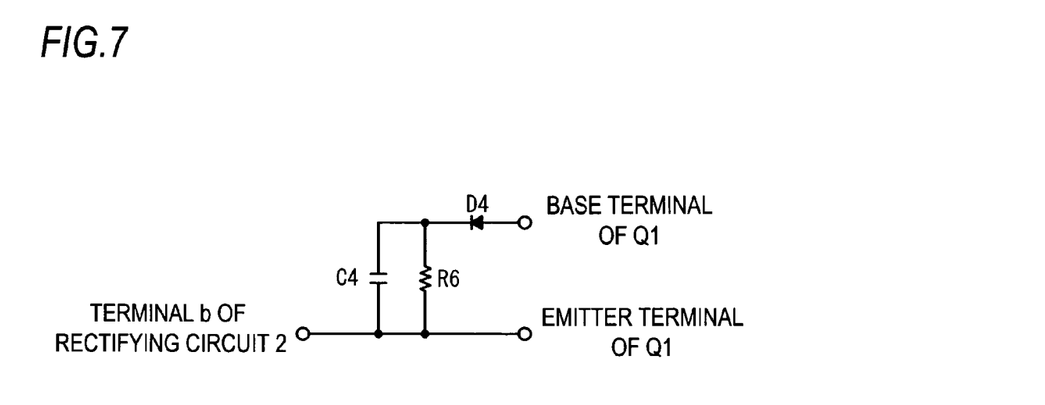
FIG. 7 is a circuit diagram illustrating one modification of an adjustment circuit.

FIG. 7 is a circuit diagram illustrating one modification of the adjustment circuit 6.

The circuit illustrated in FIG. 7 is used as the adjustment circuit 6 when each part is connected to the corresponding part of the power-supply device 1 illustrated in FIG. 1. That is, as illustrated in FIG. 7, the adjustment circuit 6 of this modification includes the diode D4, the capacitor C4, and the resistor element R6. An anode terminal of the diode D4 is connected to the base terminal of the switching element Q1. A cathode terminal of the diode D4 is connected between the terminal b (low-voltage-side line) of the rectifying circuit 3 and the emitter terminal of the switching element Q1 via the capacitor C4. The resistor element R6 is connected in parallel to the capacitor C4.

In this modification, the charge unit is configured by the diode D4 and the capacitor C4. That is, at the start-up, the electric charges are charged in the capacitor C4 via the diode D4. The time constant of the charge unit is set in view of the same viewpoint as described above. That is, a capacitance value of the capacitor C4 is set in view of a resistance value of the resistor element R1.

The discharge unit is configured by the resistor element R6 and the capacitor C4. That is, if the input of the AC voltage is stopped, the capacitor C4 is discharged, and the current flows in the resistor element R6. The time constant of the discharge unit is set in view of the same viewpoint as described above. That is, the resistance value of the resistor element R6 and the capacitance value of the capacitor C4 may be set to be smaller than a start-up interval from the stop of the input of the AC voltage to the restart of the input.

Even in the case where the adjustment circuit 6 is configured in this way, the same effect as that of the above-described illustrative embodiment can be obtained. This modification can reduce the number of the circuit elements constituting the adjustment circuit 6.

Other

The configuration of the adjustment unit is not limited to the above-described illustrative embodiment or the modification thereof. The circuit configuration of the rectifying unit or the converter circuit unit is not limited to the above-described illustrative embodiment.

The switching element Q1 is not limited to the bipolar transistor. For example, the switching element Q1 may be an FET or the like. Further, the switching element Q2 is not limited to the FET. For example, the switching element Q2 may be a thyristor or a bipolar transistor.

The light source of the illumination device is not limited to the LED module. For example, one LED, an electroluminescence type light source or other light sources may be used.

The power-supply device according to this disclosure is not limited to the application for use in the illumination device. This disclosure can be applied to a power-supply device for use in various apparatuses.

Although the illustrative embodiment has been described and illustrated in detail, it is clearly understood that the same is by way of illustration and example only and is not to be taken by way of limitation, the spirit and scope of this disclosure being limited only by the terms of the appended claims.

What is claimed is:

1. A power-supply device comprising:
   a rectifying unit configured to rectify a phase-controlled AC voltage;
   a current limiting unit including a current limiting resistor, which limits an input current flowing from the rectifying unit at rise of a rectified voltage outputted from the rectifying unit; and
   an adjustment unit configured to cause the current limiting unit to limit the input current flowing from the rectifying unit to a capacitor connected to a rear end of the rectifying unit and charged in accordance with the rectified voltage, until a predetermined time period has elapsed after an input of the AC voltage to the rectifying unit is started,
   wherein the current limiting unit includes a switching element which is connected in parallel to the current limiting resistor, and the current limiting unit is configured to limit the input current using the current limiting resistor when the switching element is in an OFF state, and
   wherein the adjustment unit causes the switching element to be in the OFF state until the predetermined time period has elapsed after the input of the AC voltage to the rectifying unit is started.

2. The power-supply unit according to claim 1, wherein the switching element is configured to be in the OFF state when the input of the AC voltage to the rectifying unit starts and is configured to be in an ON state after the input of the AC voltage to the rectifying unit starts, wherein the predetermined time period is a time from when the input of the AC voltage to the rectifying unit starts to when the switching element is in the ON state, and wherein the adjustment unit delays a timing at which the switching element is in the ON state, until the predetermined time period has elapsed after the input of the AC voltage to the rectifying unit is started.

3. The power-supply unit according to claim 2, wherein the switching element is to be in the ON state in accordance with a voltage to be applied to a control terminal thereof, and wherein the adjustment unit suppresses a rise rate of the voltage to be applied to the control terminal after the input of the AC voltage to the rectifying unit starts to delay the timing at which the switching element is in the ON state.

4. The power-supply unit according to claim 1, wherein the adjustment unit includes a charge unit which is charged based on a current flowing after the input of the AC voltage to the rectifying unit starts, and wherein the predetermined time period is a time period corresponding to a time constant of the charge unit.

5. The power-supply unit according to claim 4, further comprising a converter circuit unit, which includes the capacitor connected to the rear end of the rectifying unit, wherein the time constant of the charge unit is set to correspond to a time until a voltage of the capacitor reaches a predetermined voltage after the input of the AC voltage to the rectifying unit is started.

6. The power-supply unit according to claim 4, wherein the adjustment unit further includes a discharge unit to discharge electric charges charged in the charge unit when the input of the AC voltage to the rectifying unit is stopped, wherein the time constant of the discharge unit is set to be smaller than a start-up interval from the stop of the input of the AC voltage to restart of the input.

7. An illumination device comprising a power-supply device and a light source, to which electrical power is supplied from the power-supply device, wherein the power-supply device comprises:

a rectifying unit configured to rectify a phase-controlled AC voltage;

a current limiting unit including a current limiting resistor, which limits an input current flowing from the rectifying unit at rise of a rectified voltage outputted from the rectifying unit; and an adjustment unit configured to cause the current limiting unit to limit the input current flowing from the rectifying unit to a capacitor connected to a rear end of the rectifying unit and charged in accordance with the rectified voltage, until a predetermined time period has elapsed from when an input of the AC voltage to the rectifying unit is started, wherein the current limiting unit includes a switching element which is connected in parallel to the current limiting resistor, and the current limiting unit is configured to limit the input current using the current limiting resistor when the switching element is in an OFF state, and wherein the adjustment unit causes the switching element to be in the OFF state until the predetermined time period has elapsed after the input of the AC voltage to the rectifying unit is started.

* * * * *